United States Patent
Jinno et al.

(10) Patent No.: US 9,524,621 B2
(45) Date of Patent: Dec. 20, 2016

(54) INFORMATION PROCESSING METHOD, MOBILE DEVICE, AND INFORMATION PROCESSING PROGRAM

(71) Applicant: Rakuten, Inc., Tokyo (JP)

(72) Inventors: Yutaka Jinno, Tokyo (JP); Hideki Akashika, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/428,253

(22) PCT Filed: Jun. 28, 2013

(86) PCT No.: PCT/JP2013/067795
§ 371 (c)(1),
(2) Date: Mar. 13, 2015

(87) PCT Pub. No.: WO2014/207889
PCT Pub. Date: Dec. 31, 2014

(65) Prior Publication Data
US 2015/0248823 A1 Sep. 3, 2015

(51) Int. Cl.
*G08B 26/00* (2006.01)
*G08B 3/10* (2006.01)
*G06Q 30/06* (2012.01)
*G06Q 20/32* (2012.01)
*G06Q 20/34* (2012.01)
*G07C 9/00* (2006.01)

(52) U.S. Cl.
CPC ............. *G08B 3/10* (2013.01); *G06Q 20/3278* (2013.01); *G06Q 20/352* (2013.01); *G06Q 30/06* (2013.01); *G07C 9/00103* (2013.01); *G07C 2009/00769* (2013.01)

(58) Field of Classification Search
CPC .......................... G08B 26/007; G08B 26/004
USPC .................................... 340/505, 692
See application file for complete search history.

(56) References Cited

U.S. PATENT DOCUMENTS

| | | | |
|---|---|---|---|
| 5,682,142 A * | 10/1997 | Loosmore | G07C 1/10 235/385 |
| 7,580,678 B2 * | 8/2009 | Byman-Kivivuori | G06Q 20/353 455/41.2 |
| 8,732,277 B1 * | 5/2014 | Rowe | H04L 29/08072 709/219 |
| 2010/0112991 A1* | 5/2010 | Hannaby | H04M 1/2155 455/414.3 |

(Continued)

FOREIGN PATENT DOCUMENTS

| | | |
|---|---|---|
| JP | 11-16011 A | 1/1999 |
| JP | 2011-91717 A | 5/2011 |
| JP | 2013-98666 A | 5/2013 |

OTHER PUBLICATIONS

International Search Report for PCT/JP2013/067795 dated Sep. 17, 2013 [PCT/ISA/210].

*Primary Examiner* — Kevin Kim
(74) *Attorney, Agent, or Firm* — Sughrue Mion, PLLC (57) ABSTRACT

A mobile terminal inputs a sound effect output from a communication device through a microphone in response to completion of access to an IC module, and determines whether a sound pattern of the input sound effect indicates a preset sound pattern. When it is determined that the sound pattern of the input sound effect indicates the preset sound pattern, the mobile terminal transmits specific information to a specific destination.

18 Claims, 5 Drawing Sheets

(56) References Cited

U.S. PATENT DOCUMENTS

| | | | |
|---|---|---|---|
| 2011/0095876 A1* | 4/2011 | Tanaka | H04M 1/72522 340/407.1 |
| 2013/0214925 A1* | 8/2013 | Weiss | G08B 25/001 340/539.11 |
| 2015/0070184 A1* | 3/2015 | Dadu | G08B 21/24 340/692 |

* cited by examiner

INFORMATION PROCESSING METHOD, MOBILE DEVICE, AND INFORMATION PROCESSING PROGRAM

CROSS REFERENCE TO RELATED APPLICATIONS

This application is a National Stage of International Application No. PCT/JP2013/067795, filed on Jun. 28, 2013, the contents of all of which are incorporated herein by reference in their entirety.

TECHNICAL FIELD

The present invention relates to the technical fields of devices capable of inputting sound effects output from an access device in response to completion of access to an IC module.

BACKGROUND ART

In the past, there has been known an IC card which is mounted with a non-contact IC chip (an example of an IC module) performing communication between external access devices in a non-contact manner. As a technology using such an IC card, a technology disclosed in Patent Literature 1 is known. Patent Literature 1 discloses a method of automatically notifying a fact of passage or a passage record to a preset specific notification destination when a user passes through an entrance/exit gate by an entrance/exit ticket using an IC card. In this method, an IC card reader and a computer are installed in an entrance/exit gate. Upon entrance and exit, when the reader reads data of the IC card, the computer transmits information, such as a gate passage time and a passage position, to a notification destination preregistered in the IC card through a network line. Also, the above-described IC module may be mounted (embedded) on a mobile terminal, such as a mobile phone, and the mobile terminal can be used similarly to the IC card.

PRIOR ART LITERATURE

Patent Literature

Patent Literature 1: JP 11-16011 A

SUMMARY OF THE INVENTION

Problem to be Solved by the Invention

However, in the method described in Patent Literature 1, the computer having an information transmission function needs to be installed at all entrance/exit gates through which a user may pass, so that the computer installed at the entrance/exit gate can perform the process of transmitting information to the notification destination. The same problem occurs when such technology is applied to, for example, an IC card reader installed at an entrance of a building or an IC card reader installed in a checkout counter or the like.

The technical problem to be solved by the present invention is to provide an information processing method, a mobile device, and an information processing program, capable of notifying specific information to a specific destination in response to completion of access to an IC module, without installing a computer having an information transmission function on an external device side accessible to an IC module mounted on an IC card or a mobile terminal.

Means for Solving the Problem

In order to solve the above problem, the invention according to claim 1 is an information processing method, which causes a mobile device to execute an information processing program,
the information processing method comprising:
an inputting step of inputting a sound effect output from an access device in response to completion of access to an IC module; and
a transmitting step of transmitting specific information to a specific destination in response to an input of a sound effect indicating a preset sound pattern.

According to this invention, the specific information can be notified to the specific destination in response to the completion of the access to the IC module, without installing a computer having an information transmission function on an external device side capable of accessing the IC module mounted on an IC card or a mobile terminal.

The invention according to claim 2 is the information processing method according to claim 1, further comprising:
an acquiring step of acquiring information written in the IC module from the IC module in response to the input of the sound effect indicating the preset sound pattern.

According to this invention, the specific information can be notified at the timing of the access from the communication device to the IC module and other timing.

The invention according to claim 3 is the information processing method according to claim 2, further comprising:
a first determining step of determining whether to transmit the specific information, based on the information acquired by the acquiring step,
wherein the transmitting step transmits the specific information to the destination only when it is determined to transmit the specific information by the first determining step.

According to this invention, it is possible to reduce the notification of information that is likely to be noise to a recipient of the specific information.

The invention according to claim 4 is the information processing method according to claim 2 or 3, further comprising:
a first deciding step of deciding a certain destination among a plurality of predetermined destinations as the specific destination to which the specific information is to be transmitted, based on the information acquired by the acquiring step,
wherein the transmitting step transmits the specific information to the specific destination decided by the first deciding step.

According to this invention, the specific information can be more easily acquired.

The invention according to claim 5 is the information processing method according to any one of claims 2 to 4, further comprising:
a second deciding step of deciding certain information among a plurality of information being transmission candidates as the specific information, based on the information acquired by the acquiring step,
wherein the transmitting step transmits the specific information decided by the second deciding step to the specific destination.

According to this invention, the information desired by the recipient of the specific information can be rapidly grasped by the recipient.

The invention according to claim 6 is the information processing method according to any one of claims 2 to 5, further comprising:

a second determining step of determining whether the access device is fixedly installed, based on the information acquired by the acquiring step, wherein when it is determined by the second determining step that the access device is not fixedly installed, the transmitting step transmits the specific information, including location information acquired by a GPS function of the mobile device, to the specific destination.

According to this invention, even when the access device is installed in the vehicle of the transportation facility, highly accurate location information can be notified as the specific information.

The invention according to claim 7 is the information processing method according to any one of claims 1 to 6, further comprising:

a sensing step of sensing access of the IC module and the access device by monitoring a state of the IC module; and a switching step of switching a microphone function for inputting the sound effect from off to on when the access is sensed by the sensing step.

According to this invention, the microphone function need not be always turned on and the consumption of the battery can be suppressed.

The invention according to claim 8 is the information processing method according to any one of claims 1 to 7, wherein the transmitting step transmits the specific information to the specific destination only when a sound effect corresponding to the sound pattern indicating that a payment of a transaction has been normally completed is input.

According to this invention, since the notification is performed only when the payment has been normally made, it is possible to reduce the notification of information that is likely to be noise to a recipient of the specific information.

The invention according to claim 9 is a mobile device comprising:

an inputting means that inputs a sound effect output from an access device in response to completion of access to an IC module; and a transmitting means that transmits specific information to a specific destination in response to an input of a sound effect indicating a preset sound pattern.

The invention according to claim 10 is an information processing program, which causes a computer to perform:

an inputting step of inputting a sound effect output from an access device in response to completion of access to an IC module; and a transmitting step of transmitting specific information to a specific destination in response to an input of a sound effect indicating a preset sound pattern.

Advantageous Effects of the Invention

According to the present invention, it is possible to notify specific information to specific destination in response to the completion of the access to the IC module, without installing a computer having an information transmission function on an external device side capable of accessing the IC module mounted on an IC card or a mobile terminal.

MODE FOR CARRYING OUT THE INVENTION

Hereinafter, embodiments of the present invention will be described with reference to the drawings. Also, embodiments described below are embodiments in a case where the present invention is applied to an information processing system.

[1. Schematic Configuration of Information Processing System S]

Figure 1:
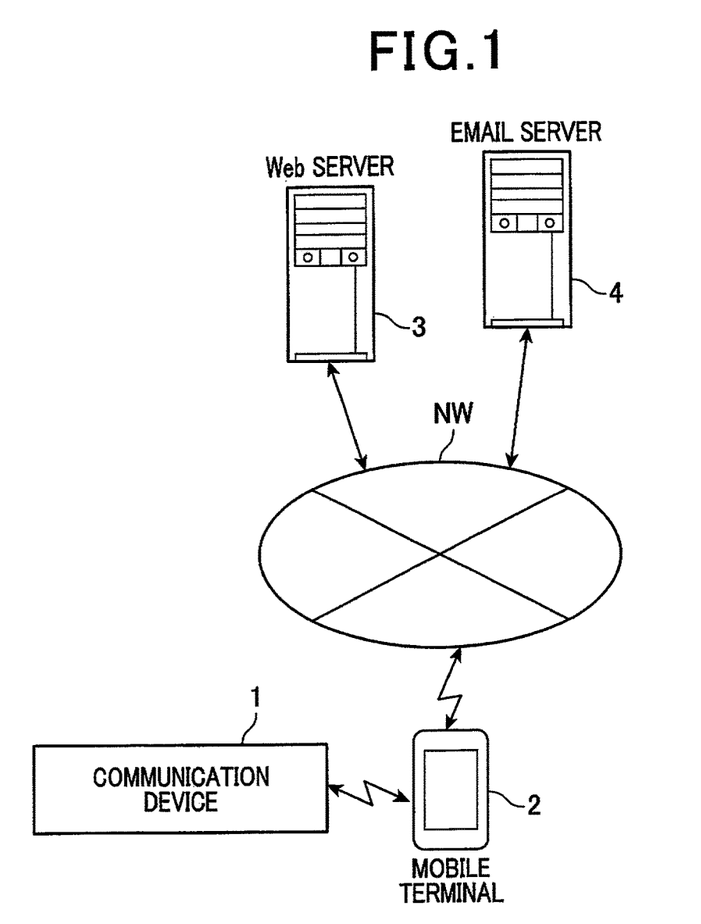
FIG. 1 is a diagram illustrating a schematic configuration example of an information processing system S according to the present embodiment.

First, the schematic configuration example of the information processing system S according to the present embodiment will be described with reference to FIG. 1 and the like. FIG. 1 is a diagram illustrating a schematic configuration example of an information processing system S according to the present embodiment. As illustrated in FIG. 1, the information processing system S according to the present embodiment is configured using a communication device 1 and a mobile terminal 2. The communication device 1 is an example of an access device according to the present invention and is a device that accesses an IC module in a non-contact manner and outputs a sound effect in response to completion of the access. The communication device 1 is installed in, for example, a ticket gate of a transportation facility, an entrance/exit gate of a facility (e.g., a building, an amusement park, a movie theater, or the like), an inside of a vehicle of a transportation facility (e.g., a bus or a taxi), a checkout counter of a shop, and the like. The communication device 1 is used for various purposes, such as a payment of an electronic value, a user authentication, and a time stamp. On the other hand, the mobile terminal 2 is an example of a mobile device according to the present invention. For example, a smartphone, a mobile phone, a game machine, a tablet computer, and the like can be applied. The mobile terminal 2 can access a web server 3 or an email server 4 through a network NW. The network NW is configured by a dedicated line, a mobile communication network, the Internet, and the like.

Figure 2A:
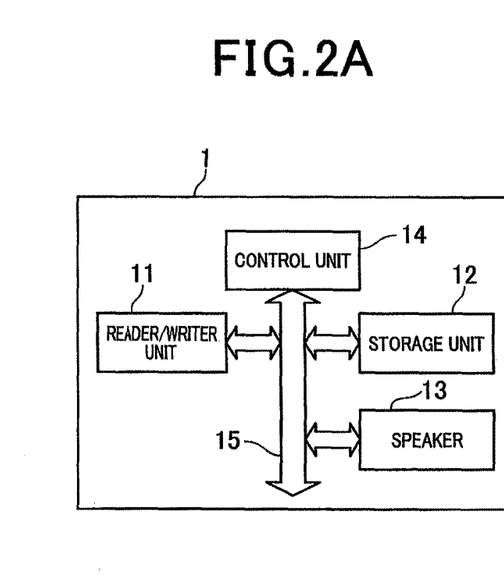
FIG. 2A is a diagram illustrating a schematic configuration example of a communication device 1 according to the present embodiment.

FIG. 2A is a diagram illustrating a schematic configuration example of the communication device 1 according to the present embodiment. As illustrated in FIG. 2A, the communication device 1 is configured using a reader/writer unit 11, a storage unit 12, a speaker 13, and a control unit 14. Each of the reader/writer unit 11, the storage unit 12, and the speaker 13 is connected to the control unit 14 through an input/output interface unit (not illustrated) and a bus 15.

The reader/writer unit 11 includes, for example, a reader and an antenna adopting a near field communication (NFC) technology using a frequency of 13.56-MHz band. The reader/writer unit 11 communicates with an IC module close to a distance range where the near field communication is possible by an electromagnetic wave (carrier wave).

The storage unit 12 is configured by, for example, nonvolatile memory such as flash memory or EEPROM. An operating system or an application program is stored in the storage unit 12. Examples of the application program include an electronic value payment processing program, a user authentication processing program, and a time stamp processing program. The contents of such programs are different according to the purpose of the communication device 1.

The control unit 14 is configured by, for example, a CPU, ROM, and RAM. When the reader/writer unit 11 accesses the IC module, the control unit 14 performs a predetermined process according to the program and outputs a sound effect from the speaker 13 in response to the completion of the access. Examples of the process include an electronic value payment process, a user authentication process, and a time stamp process.

For example, in the electronic value payment process, the control unit 14 compares the balance of the electronic value acquired from the IC module through the reader/writer unit 11 with payment amount. When the balance is equal to or more than the payment amount, the control unit 14 transmits log information (log data) about the corresponding payment and balance change information changing the balance of the electronic value (that is, reducing the balance by the payment amount) to the IC module through the reader/writer unit 11. Due to the balance change information, the balance of the electronic value stored in the IC module is rewritten. Also, log information is written to the IC module. A process completion notification is replied from the IC module to the reader/writer unit 11. The control unit 14 outputs a sound effect indicating normal completion of the corresponding payment process, in response to the completion of the access by the reception of the process completion notification. The log information includes information such as an e-money number, a payment date, a payment amount, and a balance after payment. Also, for example, log information of the payment process at the ticket gate of the transportation facility includes information on a boarding station name (so-called boarding data). On the other hand, when the balance is less than the payment amount, the control unit 14 outputs a sound effect indicating abnormal completion of the payment process (error). Also, in the payment process, the control unit 14 may be configured to transmit a communication device ID (identification information identifying the communication device 1) to the IC module through the reader/writer unit 11. In this case, the corresponding communication device ID is written to the IC module.

Also, for example, in the user authentication process, the control unit 14 compares a user ID (identification information identifying the user of the communication device 1) acquired from the IC module through the reader/writer unit 11 with a user ID managed by the communication device 1. When both of the user IDs are matched with each other, the control unit 14 transmits authentication result information indicating normal completion of the user authentication process to the IC module through the reader/writer unit 11. Therefore, authentication result information is written to the IC module. A process completion notification is replied from the IC module to the reader/writer unit 11. The control unit 14 outputs a sound effect indicating the normal completion of the corresponding user authentication process, in response to the completion of the access by the reception of the process completion notification. The authentication result information includes the indication of authentication success and an authentication date. On the other hand, when both of the user IDs are not matched with each other, the control unit 14 outputs a sound effect indicating abnormal completion of the authentication process (error).

Also, for example, in the time stamp process, the control unit 14 transmits time stamp information to the IC module through the reader/writer unit 11. Therefore, time stamp information is written to the IC module. A process completion notification is replied from the IC module to the reader/writer unit 11. The control unit 14 outputs a sound effect indicating completion of the corresponding time stamp, in response to the completion of the access by the reception of the process completion notification. The time stamp information includes a time-stamped date or the like.

Figure 2B:
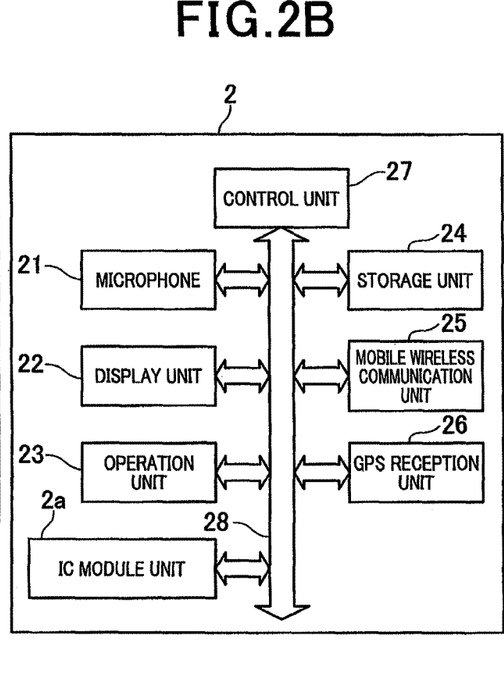
FIG. 2B is a diagram illustrating a schematic configuration diagram of a mobile terminal 2 according to the present invention.

FIG. 2B is a diagram illustrating a schematic configuration example of the mobile terminal 2 according to the present embodiment. As illustrated in FIG. 2B, the mobile terminal 2 is configured to include a microphone 21, a display unit 22, an operation unit 23, a storage unit 24, a mobile wireless communication unit 25, a global positioning system (GPS) reception unit 26, and a control unit 27. The microphone 21, the display unit 22, the operation unit 23, the storage unit 24, the mobile wireless communication unit 25, and the GPS reception unit 26 are connected to the control unit 27 through an input/output interface unit (not illustrated) and a bus 28. Also, a battery (not illustrated) as a power supply is embedded in the mobile terminal 2 and supplies power to the microphone 21, the display unit 22, the operation unit 23, the storage unit 24, the mobile wireless communication unit 25, the GPS reception unit 26, and the control unit 27.

Furthermore, an IC module unit 2a, which is connected to the control unit 27 through the input/output interface (not illustrated) and the bus 28, is embedded in the mobile terminal 2. The IC module unit 2a includes, for example, an IC module and an antenna adopting an NFC technology as described above. The IC module is configured by, for example, a non-contact IC chip including a CPU, ROM, RAM, and nonvolatile memory. The IC module may be configured to be directly incorporated on a circuit board of the mobile terminal 2. When the IC module unit 2a is used in the electronic value payment process, for example, the balance of the electronic value, the log information, and the e-money number are stored in the nonvolatile memory. Also, when the IC module unit 2a is used in the user authentication process, the user ID and the authentication result information are stored in the nonvolatile memory. Also, when the IC module unit 2a is used in the time stamp process, the user ID and the time stamp information are stored in the nonvolatile memory. Also, the communication device ID transmitted from the reader/writer unit 11 of the communication device 1 may be stored in the nonvolatile memory. Also, the IC module includes a plurality of terminals connected to the antenna and the input/output interface unit. When an electromagnetic wave of a specific frequency (e.g., 13.56-MHz carrier wave) is detected, a voltage state at a specific terminal among the plurality of terminals is switched from off to on. The on/off state of the specific terminal is monitored as a state of the IC module by the control unit 27.

The microphone 21 is provided for inputting a sound from the outside. In the present embodiment, the microphone 21 inputs a sound effect output from the speaker 13 of the communication device 1. The microphone function for inputting the sound effect by the microphone 21 is turned off when the communication device 1 does not access the mobile terminal 2, and power is not supplied from the battery when the microphone function is turned off.

The display unit 22 is configured by, for example, a touch screen display. User-specified icons or user guidance information is displayed on the display according to a control signal from the control unit 27. The operation unit 23 is configured by an input button for inputting an instruction from the user. The operation unit 23 can input the instruction through the icon displayed on the touch screen display.

The storage unit 24 is configured by, for example, non-volatile memory such as flash memory or EEPROM. An operating system and an application program (including an information processing program of the present invention) are stored in the storage unit 24. The application program is a program that causes the control unit 27 of the mobile terminal 2 to execute an information processing method which is to be described below. The application program of the present embodiment causes the control unit 27 to execute at least a step of inputting a sound effect output from the speaker 13 of the communication device 1, and a transmitting step of transmitting information specified to a destination associated with a relevant sound pattern (hereinafter, referred to as "specific information") in response to an input of a sound effect indicating a preset sound pattern. Also, the application program, for example, may be downloaded from a predetermined server or the like through the network NW, or may be stored in and read from a predetermined recording medium, such as an external USB memory, a CD, and a DVD.

Also, the storage unit 24 stores pattern data corresponding to the sound pattern of the sound effect. The sound pattern of the sound effect is defined by, for example, a frequency characteristic of the sound effect (e.g., characteristic indicating a sound pressure level of each predetermined frequency). The pattern data is generated by, for example, a frequency analysis of a sound effect actually output from the communication device 1. The generated pattern data is set and stored as data that can be referenced by the application program. Also, as described above, the sound pattern of the sound effect output from the communication device 1 may be different according to the processing result of the communication device 1. For example, there are a sound pattern when the access has been completed by the normal completion of the process in the communication device 1 (hereinafter, referred to as "normal sound pattern") and a sound pattern when the access has been completed by the abnormal completion of the process in the communication device 1 (error) (hereinafter, referred to as "error sound pattern"). In this case, pattern data corresponding to the respective sound patterns are stored in the storage unit 24, and the respective pattern data are associated with the contents of the information transmission process that is executed by the control unit 27. The correspondence relationship between the pattern data and the contents of the information transmission process may be defined in the application program of the present invention, or may be defined in a table stored in the storage unit 24.

The mobile wireless communication unit 25 is configured to perform wireless communication with a base station in a mobile wireless communication network. Therefore, the control unit 27 can access the web server 3 or the email server 4 through the network NW. The GPS reception unit 26 receives a navigation radio wave output from a GPS satellite, and detects latitude and longitude based on the received signal.

Figure 2C:
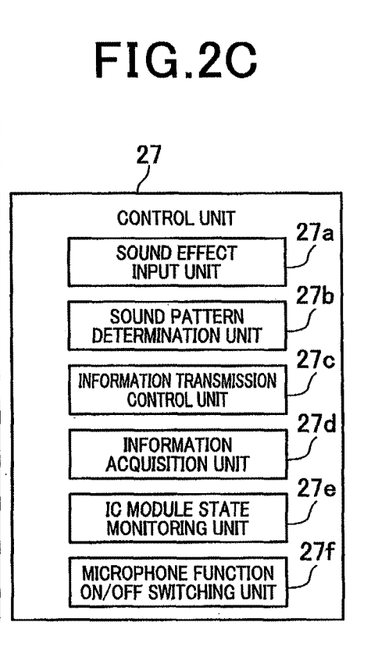
FIG. 2C is a diagram illustrating an example of a function block of a control unit 27.

The control unit 27 is configured by, for example, a CPU, ROM, and RAM. FIG. 2C is a diagram illustrating an example of a function block of the control unit 27. The control unit 27 as a computer executes, for example, a process according to the application program stored in the storage unit 24. In this process, as illustrated in FIG. 2C, the control unit 27 functions as a sound effect input unit 27a, a sound pattern determination unit 27b, an information transmission control unit 27c, an information acquisition unit 27d, an IC module state monitoring unit 27e, and a microphone function on/off switching unit 27f. Also, the sound effect input unit 27a is an example of an inputting means of the present invention. The information transmission control unit 27c is an example of a transmitting means of the present invention.

The sound effect input unit 27a inputs a sound effect output from the communication device 1 through the microphone 21 in response to the completion of the access to the IC module unit 2a. The sound pattern determination unit 27b determines whether the sound pattern of the sound effect input through the microphone 21 indicates a preset sound pattern (that is, sound pattern corresponding to the pattern data stored in the storage unit 24). Herein, the sound pattern of the input sound effect is acquired by, for example, the frequency analysis of the corresponding sound effect. For example, when a difference value acquired by the pattern comparison between the sound pattern of the sound effect input through the microphone 21 and the sound pattern corresponding to the pattern data stored in the storage unit 24 is within a threshold value, it is determined that the sound pattern of the input sound effect indicates the preset sound pattern.

Also, as described above, the pattern data corresponding to the normal sound pattern and the pattern data corresponding to the error sound pattern may be stored in the storage unit 24. In this case, the sound pattern determination unit 27b may be configured to determine whether the sound pattern of the input sound effect indicates the normal sound pattern or indicates the error sound pattern, based on the pattern data.

The information transmission control unit 27c transmits specific information to a specific destination (transmission destination) through the mobile wireless communication unit 25 in response to the input of the sound effect indicating the preset sound pattern. That is, when it is determined that the sound pattern of the input sound effect indicates the preset sound pattern, the information transmission control unit 27c transmits the specific information to the specific destination through the mobile wireless communication unit 25. The specific destination is defined by, for example, the application program or setting data together with a transmission format of the specific information. The setting data can be arbitrarily set by a user or a guardian (e.g., parent) on a setting screen displayed on the display after the start of the application program of the present embodiment.

Examples of the transmission format include an email transmission format (e.g., simple mail transfer protocol (SMTP)), and an HTTP request transmission format (hypertext transfer protocol (HTTP)). Also, examples of the specific destination include an email address and a uniform resource locator (URL). Also, in the specific information to be transmitted, for example, a type of the specific information (e.g., date, location, and the like) or the source is defined by the application program or the setting data thereof. The setting data can be arbitrarily set by a user or a guardian (e.g., parent) on a setting screen displayed on the display after the start of the application program of the present embodiment.

Examples of the specific information include contact information, date information, location information, name information, and user ID. The contact information is information indicating contact matters to a recipient receiving the specific information (a person corresponding to the specific destination). The contact information can be set by, for example, the user of the mobile terminal 1 or the guardian of the user (e.g., parent). The date information is information indicating a date when the communication device 1 and the mobile terminal 2 are accessed (in other words, when the sound effect output from the communication device 1 is input to the mobile terminal 2). For example, the information acquisition unit 27*d* acquires the date information, which is included in the information (the log information, the authentication result information, or the time stamp information) written in the IC module (nonvolatile memory) in the access to the communication device 1, from the IC module unit 2*a* in response to the input of the sound effect indicating the preset sound pattern. Also, the date information may be acquired from a clock function of the mobile terminal 2 when the communication device 1 and the mobile terminal 2 are accessed.

Also, the location information is information indicating a location where the communication device 1 and the mobile terminal 2 are accessed. The location information is acquired from, for example, the GPS reception unit (GPS function). Alternatively, the location may be specified from the communication device ID. For example, a location information list associated with the communication device ID of the fixed communication device 1 and the location information (or address) of the communication device 1 may be acquired from a predetermined server. In this case, the information acquisition unit 27*d* acquires the location information from the location information list by using the communication device ID acquired from the IC module unit 2*a* as a search key. The location information list may be used by being downloaded from the server in advance, or may be used by transmitting the search key to the server. Also, the information acquisition unit 27*d* may acquire, as the location information, the communication device ID (communication device ID capable of specifying the location) itself included in the information written in the IC module in the access to the communication device 1. Also, the name information is information indicating a name of a place where the communication device 1 and the mobile terminal 2 are accessed. Examples of the name include a station name, a building name, an amusement park name, a movie theater name, a vehicle name, and a shop name. These names are acquired from a predetermined server through the network NW by using the location information acquired by the information acquisition unit 27*d* as the search key. Also, the specific information to be transmitted may be information associated with the result of process (e.g., the payment process or the authentication process) when the communication device 1 and the mobile terminal 2 are accessed. In this case, for example, the information acquisition unit 27*d* acquires the log information or the authentication result information, which is included in the information written in the IC module in the access to the communication device 1, as the information associated with the result of the process.

Also, the information transmission control unit 27*c* may be configured to determine whether to transmit the specific information, based on the information acquired by the information acquisition unit 27*d*. For example, when the time indicated by the date information acquired by the information acquisition unit 27*d* is included within a time zone (e.g., 9:00-19:00, 16:00-18:00, or 20:00-8:00) preset according to the object or purpose, or when the time is not included within the corresponding time zone, the information transmission control unit 27*c* determines to transmit the specific information (e.g., the contact information and the location information). Only when it is determined to transmit the specific information, the information transmission control unit 27*c* transmits the specific information (e.g., the contact information and the location information) to the specific destination. Therefore, it is possible to reduce the unnecessary communication load of the specific information according to the object or purpose.

Also, the information transmission control unit 27*c* may be configured to decide a certain destination among a plurality of predetermined destinations as the specific destination to which the specific information is transmitted, and transmit the specific information to the decided specific destination, based on the information acquired by the information acquisition unit 27*d*. For example, when the time indicated by the date information acquired by the information acquisition unit 27*d* is included in the time zone preset according to the object or purpose, the information transmission control unit 27*c* decides a first preset destination as the specific destination. On the other hand, when the time indicated by the date information acquired by the information acquisition unit 27*d* is included in the time zone preset according to the object or purpose, the information transmission control unit 27*c* decides a second preset destination as the specific destination. Herein, the first and second destinations are set by, for example, a recipient of the specific information. Therefore, the recipient of the specific information can easily receive and set the destination, thereby further facilitating the reception.

Also, the information transmission control unit 27*c* may be configured to decide certain information among a plurality of information being transmission candidates as the specific information, based on the information acquired by the information acquisition unit 27*d*, and transmits the decided specific information to the specific destination. For example, when the balance after payment, which is included in the latest log information acquired by the information acquisition unit 27*d*, is equal to or more than a reference value, the information transmission control unit 27*c* decide the contact information indicating the charging of the electronic value is required as the specific information, and transmits the decided specific information to the specific destination. On the other hand, when the balance after payment, which is included in the latest log information acquired by the information acquisition unit 27*d*, is less than the reference value, the information transmission control unit 27*c* decides the contact information indicating the charging of the electronic value is not required as the specific information, and transmits the decided specific information to the specific destination. Herein, the reference value is set by, for example, the recipient of the specific information. Therefore, the information desired by the recipient of the specific information can be rapidly grasped by the recipient.

Also, the information transmission control unit 27*c* may be configured to determine whether the communication device 1 is fixedly installed, based on the information acquired by the information acquisition unit 27*d*. For example, when the boarding station name information is included in the log information acquired by the information acquisition unit 27*d*, the information transmission control unit 27*c* determines that the communication device 1 is fixedly installed. When it is determined that the communication device 1 is not fixedly installed, the information transmission control unit 27*c* transmits the specific information including the location information acquired by the GPS reception unit 26 to the specific destination. Therefore, when the payment is made within the vehicle of the transportation facility (e.g., a taxi or a bus), highly accurate location information can be transmitted. On the other hand, when it is determined that the communication device 1 is fixedly installed, the information transmission control unit 27c transmits the location information, which is acquired by using the communication device ID as the search key, to the specific destination as described above. Therefore, accurate location information can be transmitted, without activating the GPS reception unit 26.

Also, for example, the information transmission control unit 27c may be configured to transmit the specific information to the specific destination only when a sound effect corresponding to a sound pattern indicating that a payment of a transaction has been normally completed (that is, when it is determined that a sound pattern of an input sound effect indicates a normal sound pattern). Therefore, it is possible to reduce transmission of information that is likely to be noise to a recipient. Alternatively, when a sound effect corresponding to a normal sound pattern is input and when a sound effect corresponding to an error sound pattern is input, at least one of the specific information and the specific destination may be differently configured.

The IC module state monitoring unit 27e senses the access of the IC module and the communication device 1 (reader/writer unit 11) by monitoring the state of the IC module. For example, the IC module state monitoring unit 27e senses the access of the IC module and the communication device 1 (reader/writer unit 11) by detecting that a voltage state at a specific terminal of the IC module is switched from off to on by an electromagnetic wave generated from the reader/writer unit 11. The microphone function on/off switching unit 27f may be configured such that the microphone function for inputting the above-described sound effect is switched from off to on when the access is sensed by the IC module state monitoring unit 27e. Therefore, the microphone function need not be always turned on and the consumption of the battery can be suppressed.

[2. Operation of Information Processing System S]

Next, the operation of the information processing system S according to the present embodiment will be described.

Embodiment 1

Figure 3:
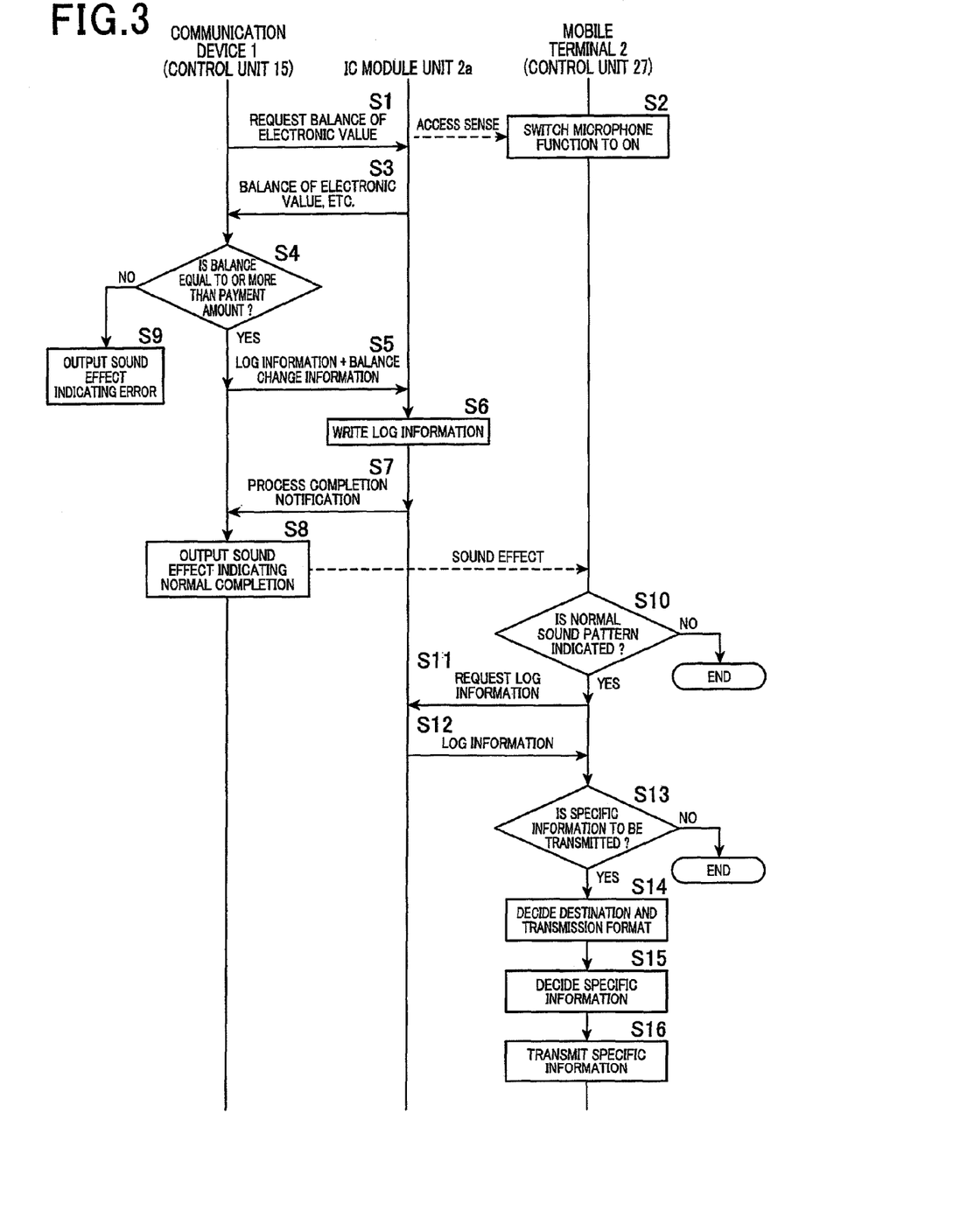
FIG. 3 is a sequence diagram illustrating an operation example when an electronic value payment process is performed.

In Embodiment 1, for example, a case where a communication device 1 installed in a ticket gate of a railroad performs an electronic value payment process will be described below with reference to FIG. 3. FIG. 3 is a sequence diagram illustrating an operation when an electronic value payment process is performed.

In FIG. 3, when the user puts the mobile terminal 2 on the reader/writer unit 11 of the communication device 1 at the ticket gate, the control unit 14 of the communication device 1 accesses the IC module unit 2a of the mobile terminal 2 through the reader/writer unit 11 and requests the IC module unit 2a of the mobile terminal 2 for the e-money number and the current balance of the electronic value (step S1). When the control unit 27 of the mobile terminal 2 senses the access of the IC module and the communication device 1 (reader/writer unit 11) by monitoring the state of the IC module, the control unit 27 of the mobile terminal 2 switches the microphone function from off to on (step S2). Therefore, the microphone function need not be always turned on and the consumption of the battery can be suppressed. On the other hand, the IC module unit 2a of the mobile terminal 2 reads the e-money number and the balance of the electronic value stored in the nonvolatile memory in response to a request from the communication device 1, and transmits the e-money number and the balance of the electronic value to the communication device (step S3).

The control unit 14 of the communication device 1 determines whether the balance is equal to or more than the payment amount by comparing the balance of the electronic value received from the IC module unit 2a through the reader/writer unit 11 with the payment amount (e.g., minimum freight charge) (step S4). When the balance is equal to or more than the payment amount (step S4: YES), the control unit 14 of the communication device 1 transmits log information on the relevant payment and balance change information, which reduces the balance of the electronic value by the payment amount, to the IC module unit 2a through the reader/writer unit 11 (step S5). Also, the control unit 14 of the communication device 1 may be configured to transmit a communication device ID to the IC module unit 2a through the reader/writer unit 11. When the IC module unit 2a of the mobile terminal 2 receives the balance change information and the log information from the communication device 1, the IC module unit 2a of the mobile terminal 2 executes a balance change process of reducing the balance of the electronic value, which is stored in the nonvolatile memory, by the payment amount, and writes the log information to the nonvolatile memory (step S6), and replies the process completion notification to the communication device 1 (step S7). Also, when the IC module unit 2a of the mobile terminal 2 receives a communication device ID from the communication device 1, the IC module unit 2a of the mobile terminal 2 writes the communication device ID to the nonvolatile memory.

When the control unit 14 of the communication device 1 receives the process completion notification from the IC module unit 2a, the control unit 14 of the communication device 1 outputs a sound effect indicating normal completion of the payment process from the speaker 13, in response to completion of access by the reception of the process completion notification (in Embodiment 1, the end of transaction) (step S8). On the other hand, when the balance is less than the payment amount (step S4: NO), the control unit 14 of the communication device 1 outputs a sound effect including abnormal completion of the payment process (error) from the speaker 13, in response to the completion of the access (step S9).

When the control unit 27 of the mobile terminal 2 inputs the sound effect output from the speaker 13 of the communication device 1 through the microphone 21, the control unit 27 of the mobile terminal 2 determines whether a sound pattern of the input sound effect indicates a preset normal sound pattern (step S10). Also, when the sound effect is input by the microphone 21 (when the sound effect is detected), the control unit 27 of the mobile terminal 2 switches the microphone function from on to off. Therefore, the microphone function need not be always turned on and the consumption of the battery can be suppressed.

When it is determined that the sound pattern of the input sound effect indicates the normal sound pattern (step S10: YES), the control unit 27 of the mobile terminal 2 starts an information transmission process corresponding to the normal sound pattern, and requests the IC module unit 2a for log information (that is, latest log information) written to the nonvolatile memory in step S6 (step S11). The IC module unit 2a of the mobile terminal 2 reads the log information stored in the nonvolatile memory in response to a request from the control unit 27, and outputs the log information to the control unit 27 (step S12). On the other hand, when it is determined that the sound pattern of the input sound effect does not indicate the normal sound pattern (step S10: NO), the process is ended. Also, when it is determined that the sound pattern of the input sound effect does not indicate the normal sound pattern, the sound pattern of the input sound effect may be configured to determine whether the sound pattern of the input sound effect indicates the preset error sound pattern. When it is determined that the sound pattern of the input sound effect indicates the preset error sound pattern, the control unit 27 of the mobile terminal 2 may be configured to perform the information transmission process corresponding to the error sound pattern.

When the control unit 27 of the mobile terminal 2 acquires the log information from the IC module unit 2a, the control unit 27 of the mobile terminal 2 determines whether to transmit the specific information, based on the log information (step S13). For example, it is determined whether the payment date included in the log information acquired from the IC module unit 2a is included in the set time zone. When it is determined that the payment date is included in the preset time zone, it is determined to transmit the specific information. Herein, the set time zone is a time zone set by, for example, a parent of children attending school with the mobile terminal 2, and is a time zone (e.g., 16:00-18:00) at which the children passes through a ticket gate usually used (e.g., getting off) when returning home. Therefore, the parent who returns home later than the children can perform setting such that the specific information is transmitted to, for example, an email address of the parent in a case where the children pass through the ticket gate at time zones other than the set time zone. Also, when the payment date included in the log information acquired from the IC module unit 2a is included in the set time zone, it may be determined to transmit the specific information. In this case, the parent who returns home later than the children can perform setting such that the specific information is transmitted to, for example, an email address of the parent in a case where the children pass through the ticket gate at the set time zone.

Alternatively, it is determined whether the boarding station name included in the log information acquired from the IC module unit 2a is a set station name. When it is determined that the boarding station name is not the corresponding station name, it may be determined to transmit the specific information. Herein, the set station name is a station name set by, for example, a parent of children attending school with the mobile terminal 2, and is a station name of a station generally used when the children return home. Therefore, the parent can perform setting such that the specific information is transmitted to, for example, an email address of the parent when the children pass through a ticket gate of a state whose name is different from the set station name. Also, when it is determined that the boarding station name included in the log information acquired from the IC module unit 2a is the set station name, it may be determined to transmit the specific information. In this case, the parent can perform setting such that the specific information is transmitted to, for example, an email address of the parent when the children pass through a ticket gate of a state whose name is identical to the set station name.

By the way, the station name may not be included in the log information. In this case, the control unit 27 of the mobile terminal 2 acquires the communication device ID written in the nonvolatile memory from the IC module unit 2a as described above. The control unit 27 of the mobile terminal 2 acquires location information from the location information list by using the acquired communication device ID as the search key, and acquires the station name from the predetermined server through the network NW by using the location information as the search key. It may be determined whether the acquired station name is the set station name.

When it is determined not to transmit the specific information (step S13: NO), the process is ended. On the other hand, when it is determined to transmit the specific information (step S13: YES), the control unit 27 of the mobile terminal 2 decides the destination (transmission destination) and the transmission format of the specific information (step S14). The destination and the transmission format decided herein are a destination and a transmission format preset by, for example, the user of the mobile terminal 2. Alternatively, the control unit 27 of the mobile terminal 2 may be configured to decide a certain destination among a plurality of predetermined destinations as the specific destination to which the specific information is to be transmitted, based on the log information acquired from the IC module unit 2a. For example, it is determined whether the payment date included in the log information acquired from the IC module unit 2a is included in the set time zone. When it is determined that the payment date is included in the preset time zone, the set first destination is decided as the specific destination. On the other hand, when it is determined that the payment date included in the log information acquired from the IC module unit 2a is not included in the set time zone, the set second destination is decided as the specific destination. Herein, for example, the set time zone is a time zone set by the parent of the children who attend school with the mobile terminal 2, and is a time zone at which the parent is in the office (e.g., 9:00-20:00). Also, the set first destination may be, for example, an email address of a mobile phone of the parent, and the set second destination may be, for example, an email address received by an email program of a personal computer of the parent. Therefore, the parent can set the email address easy to receive the specific information.

Subsequently, the control unit 27 of the mobile terminal 2 decides the specific information to be transmitted (step S15). The decided specific information is information preset by, for example, the user of the mobile terminal 2. Also, the decided specific information is information whose acquisition destination or type is preset by, for example, the user of the mobile terminal 2. Also, the control unit 27 of the mobile terminal 2 may be configured to decide certain information among a plurality of information being transmission candidates as the specific information, based on the log information acquired from the IC module unit 2a. For example, it is determined whether the balance after payment, which is included in the log information acquired from the IC module unit 2a, is equal to or more than a reference value. When it is determined that the balance after payment is equal to or more than the reference value, the contact information indicating that the charging of the electronic value is required is decided as the specific information. On the other hand, when it is determined that the balance after payment is equal to or more than the reference value, the contact information indicating that the charging of the electronic value is not required is decided as the specific information. Herein, the reference value and the contact information are set by, for example, the parent of the children attending school with the mobile terminal 2. Therefore, the parent can rapidly grasp whether the charging of the electronic value is required.

Also, when the specific information decided in step S15 is date information, the control unit 27 of the mobile terminal 2 acquires a payment date included in the log information acquired from the IC module unit 2a as the date information. Alternatively, in this case, the control unit 27 of the mobile terminal 2 may be configured to acquire the date information from the clock function of the control unit 27. Also, when the specific information decided in step S15 is location information, the control unit 27 acquires the location information from a location information list by using the communication device ID acquired from the IC module unit 2a as the search key, or acquires the location information from the GPS reception unit 26. In this case, as described above, the control unit 27 determines whether the communication device 1 is fixedly installed. The control unit 27 may be configured to acquire the location information from the GPS reception unit 26 as the specific information only when the communication device 1 is not fixedly installed.

Subsequently, the control unit 27 of the mobile terminal 2 transmits the decided specific information to the decided destination through the mobile wireless communication unit 25 in the decided transmission format (step S16). For example, the email transmits the specific information, including the date information, the location information, the name information, and the contact information to the email address. The transmitted email is received through the network NW by the email server 4. For example, the recipient of the specific information acquires and browses the email from the email server 4 by the email program of his/her own mobile phone or personal computer.

Also, Embodiment 1 described above can be applied to the payment process in the vehicle of the transportation facility (e.g., a taxi or a bus), the checkout counter of the shop, and the like, as well as the ticket gate of the railroad. For example, in various payment processes in the ticket gate of the railroad, the vehicle of the transportation facility, or the checkout counter of the shop, when the sound pattern of the sound effect input from the communication device 1 to the mobile terminal 2 indicates the preset sound pattern, specific information including, for example, a user name, a payment date, a payment amount, a payment location, and a payment object (purchase object) may be transmitted to, for example, a URL corresponding to a payment log management site. Therefore, it is possible to automatically create a pocket money book.

Also, the embodiment is an example when the present invention is applied to the payment process by the electronic value, but the present invention can also be applied to a payment process by a credit card. In this case, for example, when a credit card number, an expiration date, or the like acquired from the IC module unit 2a of the mobile terminal 2 through the reader/writer unit 11, the communication device 1 transmits a request for a credit inquiry (authorization) including a payment amount or the like together with the credit card number and the expiration date, to a payment processing server through the network NW. When the payment processing server receives the request for the credit inquiry from the communication device 1, the payment processing server processes the credit inquiry of the user and transmits credit card availability information to the communication device 1. When the received availability information indicates "available", the communication device 1 outputs a sound effect indicating the normal completion of the corresponding payment process from the speaker 13. When the sound pattern of the input sound effect indicates the preset sound pattern, the mobile terminal 2 transmits the specific information to the specific destination as described above.

Embodiment 2

Figure 4:
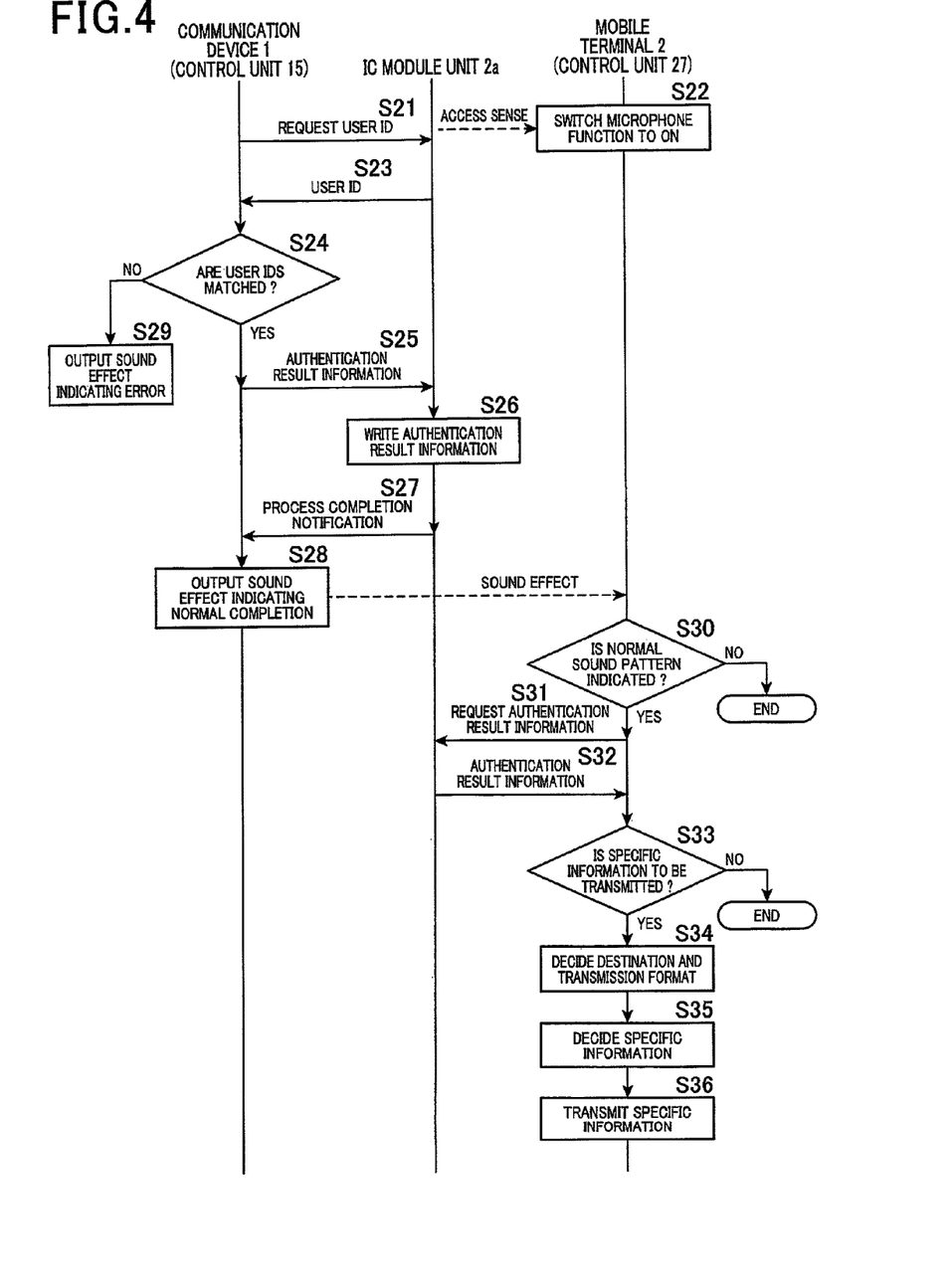
FIG. 4 is a sequence diagram illustrating an operation example when a user authentication process is performed.

In Embodiment 2, for example, a case where a communication device 1 installed in an entrance/exit gate of a building performs a user authentication process will be described below with reference to FIG. 4. FIG. 4 is a sequence diagram illustrating an operation example when a user authentication process is performed.

In FIG. 4, when the user puts a mobile terminal 2 on a reader/writer unit 11 of the communication device 1 at the entrance/exit gate of the building, a control unit 14 of the communication device 1 may access an IC module unit 2a of the mobile terminal 2 through the reader/writer unit 11 and requests the IC module unit 2a of the mobile terminal 2 for a user ID (which may be a set of a user ID and a password. The same applies hereinafter) (step S21). When a control unit 27 of the mobile terminal 2 senses the access of the IC module and the communication device 1 (reader/writer unit 11) by monitoring the state of the IC module, the control unit 27 of the mobile terminal 2 switches a microphone function from off to on (step S22). On the other hand, the IC module unit 2a of the mobile terminal 2 reads the user ID stored in the nonvolatile memory in response to a request from the communication device 1, and outputs the user ID to the communication device 1 (step S23).

The control unit 14 of the communication device 1 by compares the user ID received from the IC module unit 2a through the reader/writer unit 11 with the user ID managed by the communication device 1, and determines whether both of the user IDs are matched with each other (step S24). When both of the user IDs are matched with each other (step S24: YES), the control unit 14 of the communication device 1 transmits authentication result information indicating completion of the user authentication process to the IC module through the reader/writer unit 11 (step S25). When the IC module unit 2a of the mobile terminal 2 receives the authentication result information from the communication device 1, the IC module unit 2a of the mobile terminal 2 writes the authentication result information to the nonvolatile memory (step S26) and replies a process completion notification to the communication device 1 (step S27).

When the control unit 14 of the communication device 1 receives the process completion notification from the IC module unit 2a, the control unit 14 of the communication device 1 outputs a sound effect indicating the normal completion of the user authentication process from the speaker 13, in response to completion of access by the reception of the process completion notification (step S28). On the other hand, when both of the user IDs are not matched with each other (step S24: NO), the control unit 14 of the communication device 1 outputs a sound effect including abnormal completion of the payment process (error) from a speaker 13, in response to the completion of the access (step S29).

When the control unit 27 of the mobile terminal 2 inputs the sound effect output from the speaker 13 of the communication device 1 through a microphone 21, the control unit 27 of the mobile terminal 2 determines whether a sound pattern of the input sound effect indicates a preset normal sound pattern (step S30). Also, when the sound effect is input by the microphone 21 (when the sound effect is detected), the control unit 27 of the mobile terminal 2 switches the microphone function from on to off.

When it is determined that the sound pattern of the input sound effect indicates the normal sound pattern (step S30: YES), the control unit 27 of the mobile terminal 2 starts an information transmission process corresponding to the normal sound pattern, and requests the IC module unit 2a for the authentication result information (that is, latest authentication result information) written to the nonvolatile memory in step S26 (step S31). The IC module unit 2a of the mobile terminal 2 reads the authentication result information stored in the nonvolatile memory in response to a request from the control unit 27, and outputs the authentication result information to the control unit (step S32). On the other hand, when it is determined that the sound pattern of the input sound effect does not indicate the normal sound pattern (step S30: NO), the process is ended.

When the control unit 27 of the mobile terminal 2 acquires the authentication result information from the IC module unit 2a, the control unit 27 of the mobile terminal 2 determines whether to transmit the specific information, based on the authentication result information (step S33). For example, it is determined whether the authentication date included in the authentication result information acquired from the IC module unit 2a is included in the set time zone. When it is determined that the authentication date is included in the preset time zone, it is determined to transmit the specific information. Herein, for example, the set time zone is a time zone set by an office worker who commutes with the mobile terminal 1 and is a time zone at which the office worker leaves the office (e.g., 18:00-19:00). Therefore, when the office worker left the office so as to return home, it can be set such that the specific information is transmitted to, for example, an email address of a spouse. When the office worker left the office out of this time zone, the specific information can be transmitted to, for example, the email address of the spouse, as the leaving of the office for reasons other than returning home.

When it is determined not to transmit the specific information (step S33: NO), the process is ended. On the other hand, when it is determined to transmit the specific information (step S13: YES), the control unit 27 of the mobile terminal 2 decides the destination and the transmission format of the specific information (step S34). The destination and the transmission format decided herein are a destination and a transmission format preset by, for example, the user of the mobile terminal 2. Alternatively, the control unit 27 of the mobile terminal 2 may be configured to decide a certain destination among a plurality of predetermined destinations as the specific destination to which the specific information is to be transmitted, based on the authentication result information acquired from the IC module unit 2a. For example, it is determined whether the authentication date included in the authentication result information acquired from the IC module unit 2a is included in the set time zone. When it is determined that the authentication date is included in the preset time zone, the set first destination is decided as the specific destination. On the other hand, when it is determined that the authentication date included in the authentication result information acquired from the IC module unit 2a is not included in the set time zone, the set second destination is decided as the specific destination. Herein, for example, the set time zone is a time zone set by the office worker who commutes with the mobile terminal 1 and is a time zone at which the spouse of the office worker is in the office (e.g., 9:00-20:00). Also, the set first destination may be, for example, an email address of a mobile phone of the spouse, and the set second destination may be, for example, an email address received by an email program of a personal computer of the spouse. Therefore, the spouse can set the email address easy to receive the specific information.

Subsequently, the control unit 27 of the mobile terminal 2 decides the specific information to be transmitted (step S35). The decided specific information is information preset by, for example, the user of the mobile terminal 2. Also, the decided specific information is information whose acquisition destination or type is preset by, for example, the user of the mobile terminal 2.

Subsequently, the control unit 27 of the mobile terminal 2 transmits the decided specific information to the decided destination through the mobile wireless communication unit 25 in the decided transmission format (step S36). For example, the email transmits the specific information, including the date information, the location information, the name information, and the contact information to the email address. The transmitted email is received through the network NW by the email server 4. For example, the recipient of the specific information acquires and browses the email from the email server 4 by the email program of his/her own mobile phone or personal computer.

Embodiment 3

Figure 5:
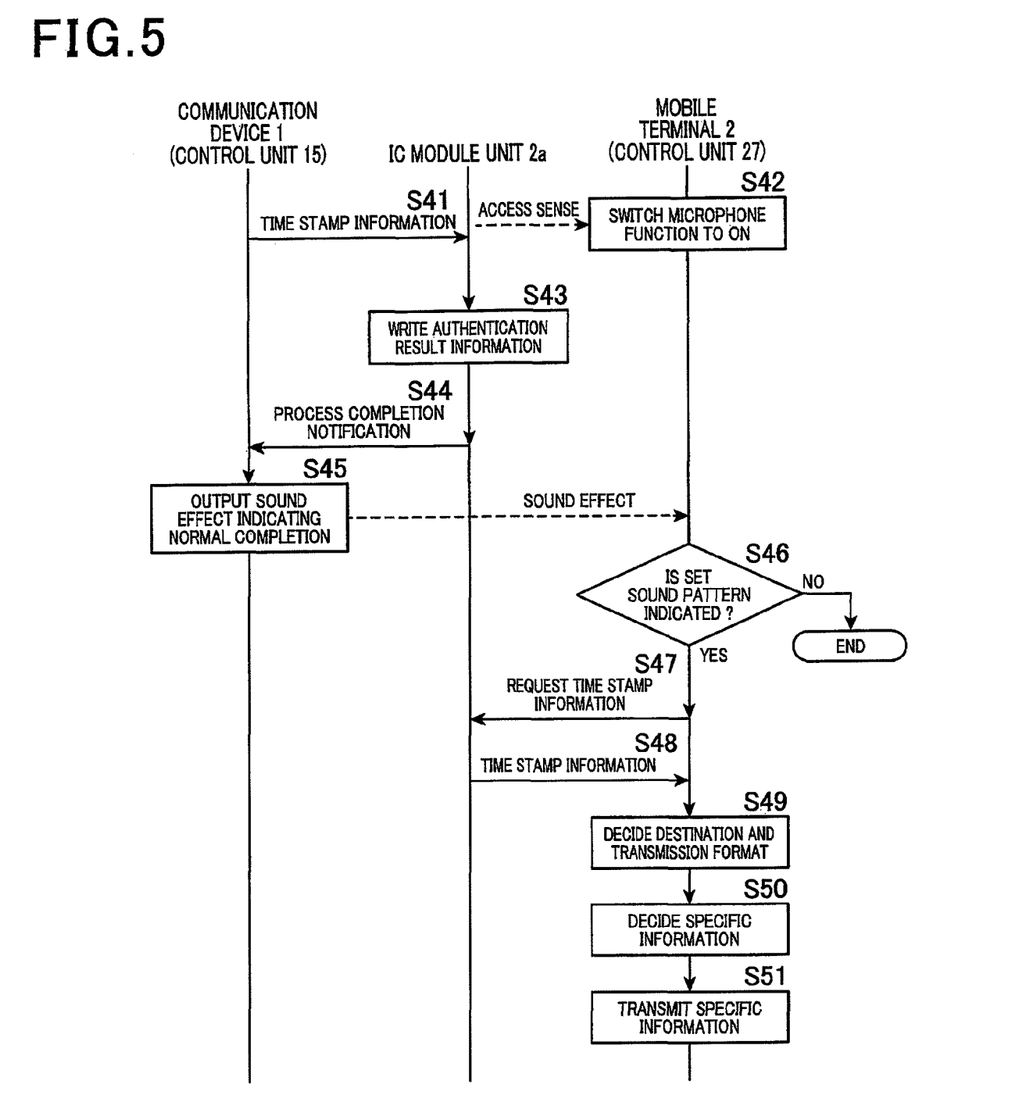
FIG. 5 is a sequence diagram illustrating an operation example when a time stamp process is performed.

In Embodiment 3, for example, a case where a communication device 1 installed in a building performs a time stamp process will be described below with reference to FIG. 5. FIG. 5 is a sequence diagram illustrating an operation example when a time stamp process is performed.

In FIG. 5, when the user puts a mobile terminal 2 on a reader/writer unit 11 of the communication device 1 at the entrance/exit gate of the building, a control unit 14 of the communication device 1 accesses an IC module unit 2a of the mobile terminal 2 through the reader/writer unit 11 and transmits time stamp information to the IC module unit 2a through the reader/writer unit 11 (step S41). When a control unit 27 of the mobile terminal 2 senses the access of the IC module and the communication device 1 (reader/writer unit 11) by monitoring the state of the IC module, the control unit 27 of the mobile terminal 2 switches a microphone function from off to on (step S42). When the IC module unit 2a of the mobile terminal 2 receives the time stamp information from the communication device 1, the IC module unit 2a of the mobile terminal 2 writes the time stamp information to the nonvolatile memory (step S43) and replies a process completion notification to the communication device 1 (step S44).

When the control unit 14 of the communication device 1 receives the process completion notification from the IC module unit 2a, the control unit 14 of the communication device 1 outputs a sound effect indicating the normal completion of the time stamp process from a speaker 13, in response to completion of access by the reception of the process completion notification (step S45).

When the control unit 27 of the mobile terminal 2 inputs the sound effect output from the speaker 13 of the communication device 1 through a microphone 21, the control unit 27 of the mobile terminal 2 determines whether a sound pattern of the input sound effect indicates a preset normal sound pattern (step S46). Also, when the sound effect is input by the microphone 21 (when the sound effect is detected), the control unit 27 of the mobile terminal 2 switches the microphone function from on to off.

When it is determined that the sound pattern of the input sound effect indicates the normal sound pattern (step S46: YES), the control unit 27 of the mobile terminal 2 starts an information transmission process, and requests the IC module unit 2a for the time stamp information (that is, latest time stamp information) written to the nonvolatile memory in step S43 and the user ID prestored in the nonvolatile memory (step S47). The IC module unit 2a of the mobile terminal 2 reads the time stamp information and the user ID stored in the nonvolatile memory in response to a request from the control unit 27, and outputs the time stamp information and the user ID information to the control unit 27 (step S48). On the other hand, when it is determined that the sound pattern of the input sound effect does not indicate the preset sound pattern (step S46: NO), the process is ended.

Subsequently, the control unit 27 of the mobile terminal 2 decides the destination and the transmission format of the specific information (step S49). Herein, the decided destination is set to, for example, a transmission format of an HTTP request, and the decided destination is set to, for example, a URL designated by a user. Subsequently, the control unit 27 of the mobile terminal 2 decides the specific information to be transmitted (step S50). For example, the control unit 27 of the mobile terminal 2 specifies, as the specific information, date information indicating a date included in the time stamp information acquired from the IC module unit 2a and the user ID acquired from the IC module unit 2a.

Subsequently, the control unit 27 of the mobile terminal 2 transmits the decided specific information to the decided destination through the mobile wireless communication unit 25 in the decided transmission format (step S51). For example, the date information and the user ID are transmitted to the URL, for example, the HTTP request included in a get parameter is transmitted to the URL. The transmitted HTTP request is received through the network NW by the web server 3. For example, the web server 3 is used as a server that manages the commuting of the user of the mobile terminal 2. When the web server 3 receives the HTTP request, the web server 3 acquires the date information and the user ID from the get parameter and registers the date information and the user ID in a database. Therefore, a web stamping function can be easily realized.

As described above, according to the embodiments, the mobile terminal 2 is configured to input the sound effect output from the communication device 1 in response to the completion of the access to the IC module unit 2a and transmit the specific information to the specific destination in response to the input of the sound effect indicating the preset sound pattern. Therefore, the mobile terminal 2 can notify the specific information to the specific destination in response to the completion of the access to the IC module unit 2a, without installing the computer having the information transmission function on the external communication device 1 side capable of accessing the IC module unit 2a mounted on the mobile terminal 2. Also, according to the embodiments, the mobile terminal 2 can notify the specific information at the timing of the access from the communication device 1 to the IC module unit 2a and other timing.

Incidentally, in the present embodiment, the example of the case where the IC module accessed by the communication device 1 is mounted on the mobile terminal 2 has been described, but the present invention can also be applied to a case where the IC module is mounted on an IC card. In this case, it is preferable that the IC module mounted on the IC card and the IC module mounted on the mobile terminal are configured to perform the above-described near field communication in a non-contact manner. However, the present invention can be applied to a case where the IC module is not mounted on the mobile terminal, that is, a case where the IC module mounted on the IC card and the mobile terminal do not communicate with each other. For example, there is a case where the mobile terminal is mounted on a case with a card holder for mobile terminal (e.g., the mobile terminal is inserted into the case), and the IC card is mounted on the card holder (e.g., the IC card is inserted into the holder). In this case, the communication device 1 accessing the IC module of the IC card mounted on the holder outputs the sound effect in response to the completion of the access. As described above, in response to the input of the sound effect indicating the present sound pattern, the mobile terminal mounted on the case transmits, to the specific destination, the specific information stored in the storage unit of the mobile terminal or the information acquired from the server through the network NW.

REFERENCE SIGN LIST

1 communication device
2 mobile terminal
2a IC module unit
21 microphone
22 display unit
23 operation unit
24 storage unit
25 mobile wireless communication unit
26 GPS reception unit
27 control unit

The invention claimed is:

1. An information processing method that is performed by a mobile device comprising a sound input unit, a communication unit, and a control unit, the information processing method comprising:
   receiving, by the sound input unit, sound output from an access device in response to completion of access between an IC module that is provided in the same body as or a different body from the mobile device and communicates with the access device by an electromagnetic wave, and the access device that communicates with the IC module by the electromagnetic wave;
   determining, by the control unit, whether the received sound indicates a specific pattern;
   making, by the control unit, a trigger a result of the determining, the result indicating that the received sound indicates the specific pattern, and directly acquiring, by the control unit, based on the trigger, information that is written in the IC module based on communication between the IC module and the access device; and
   transmitting, by the communication unit, specific information to a specific destination based on the acquired information.

2. The information processing method according to claim 1, further comprising:
   determining whether to transmit the specific information, based on the information acquired,
   wherein the transmitting comprises transmitting the specific information to the specific destination only in response to the determining to transmit the specific information based on the information acquired.

3. The information processing method according to claim 1, further comprising:
   deciding a certain destination among a plurality of predetermined destinations as the specific destination to which the specific information is to be transmitted, based on the information acquired,
   wherein the transmitting comprises transmitting the specific information to the specific destination decided.

4. The information processing method according to claim 1, further comprising:
   deciding certain information among a plurality of information being transmission candidates as the specific information, based on the information acquired, wherein the transmitting comprises transmitting the specific information decided to the specific destination.

5. The information processing method according to claim 1, further comprising:
determining whether the access device is fixedly installed, based on the information acquired,
wherein the transmitting comprises, in response to the determining that the access device is not fixedly installed, transmitting the specific information comprising location information that is acquired by a GPS function of the mobile device, to the specific destination.

6. The information processing method according to claim 1, further comprising:
sensing access of the IC module by the access device by monitoring a state of the IC module; and
switching a microphone function for receiving the sound from off to on in response to the sensing of the access.

7. The information processing method according to claim 1, wherein the transmitting comprises transmitting the specific information to the specific destination only in response to the receiving of the sound indicating that a payment of a transaction is normally completed.

8. A mobile device comprising:
a sound input unit configured to receive sound output from an access device, in response to completion of access between an IC module that is provided in the same body as or a different body from the mobile device and communicates with the access device by an electromagnetic wave, and the access device that communicates with the IC module by the electromagnetic wave;
a control unit configured to:
determine whether the received sound indicates a specific pattern;
make a trigger a result of the determining, the result indicating that the received sound indicates the specific pattern, and directly acquire, based on the trigger, information that is written in the IC module based on communication between the IC module and the access device; and
a communication unit configured to transmit specific information to a specific destination, based on the acquired information.

9. A non-transitory recording medium on which an information processing program is computer-readably recorded, the information processing program causing a control unit as a computer of a mobile device comprising a sound input unit and a communication unit, to perform:
receiving, by the sound input unit, sound output from an access device in response to completion of access between an IC module that is provided in the same body as or a different body from the mobile device and communicates with the access device by an electromagnetic wave, and the access device that communicates with the IC module by the electromagnetic wave;
determining, by the control unit, whether the received sound indicates a specific pattern;
making, by the control unit, a trigger a result of the determining, the result indicating that the received sound indicates the specific pattern, and directly acquiring, by the control unit, based on the trigger, information that is written in the IC module based on communication between the IC module and the access device; and
transmitting, by the communication unit, specific information to a specific destination based on the acquired information.

10. The information processing method according to claim 2, further comprising:
sensing access of the IC module by the access device by monitoring a state of the IC module; and
switching a microphone function for receiving the sound from off to on in response to the sensing of the access.

11. The information processing method according to claim 3, further comprising:
sensing access of the IC module by the access device by monitoring a state of the IC module; and
switching a microphone function for receiving the sound from off to on in response to the sensing of the access.

12. The information processing method according to claim 4, further comprising:
sensing access of the IC module by the access device by monitoring a state of the IC module; and
switching a microphone function for receiving the sound from off to on in response to the sensing of the access.

13. The information processing method according to claim 5, further comprising:
sensing access of the IC module by the access device by monitoring a state of the IC module; and
switching a microphone function for receiving the sound from off to on in response to the sensing of the access.

14. The information processing method according to claim 2, wherein the transmitting comprises transmitting the specific information to the specific destination only in response to the receiving of the sound indicating that a payment of a transaction is normally completed.

15. The information processing method according to claim 3, wherein the transmitting comprises transmitting the specific information to the specific destination only in response to the receiving of the sound indicating that a payment of a transaction is normally completed.

16. The information processing method according to claim 4, wherein the transmitting comprises transmitting the specific information to the specific destination only in response to the receiving of the sound indicating that a payment of a transaction is normally completed.

17. The information processing method according to claim 5, wherein the transmitting comprises transmitting the specific information to the specific destination only in response to the receiving of the sound indicating that a payment of a transaction is normally completed.

18. The information processing method according to claim 1, wherein the receiving comprises receiving, by the sound input unit, the sound output from the access device, the sound indicating one among a normal completion of a payment process between the IC module and the access device, a normal completion of a user authentication process between the IC module and the access device, and a normal completion of a time stamp process between the IC module and the access device.

* * * * *